(12) United States Patent
Acker et al.

(10) Patent No.: US 11,621,628 B2
(45) Date of Patent: Apr. 4, 2023

(54) PREDICTIVE ACTIVE FILTER FOR EMI ATTENUATION

(71) Applicant: Enphase Energy, Inc., Petaluma, CA (US)

(72) Inventors: Brian Acker, Sebastopol, CA (US); Patrick L. Chapman, Austin, TX (US); Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 268 days.

(21) Appl. No.: 17/196,736

(22) Filed: Mar. 9, 2021

(65) Prior Publication Data

US 2021/0281161 A1 Sep. 9, 2021

Related U.S. Application Data

(60) Provisional application No. 62/987,003, filed on Mar. 9, 2020.

(51) Int. Cl.
*H02M 1/14* (2006.01)
*H02M 1/44* (2007.01)
*H02M 1/15* (2006.01)

(52) U.S. Cl.
CPC ............. *H02M 1/143* (2013.01); *H02M 1/15* (2013.01); *H02M 1/44* (2013.01)

(58) Field of Classification Search
CPC ........... H02M 1/15; H02M 1/143; H02M 1/44
See application file for complete search history.

(56) References Cited

U.S. PATENT DOCUMENTS

| 5,668,464 A | * | 9/1997 | Krein | G05F 1/565 |
| | | | | 363/46 |
| 8,698,469 B1 | * | 4/2014 | Latham, II | H02M 1/15 |
| | | | | 323/283 |
| 2015/0333617 A1 | | 11/2015 | Balog et al. | |
| 2018/0331618 A1 | | 11/2018 | Engelhardt et al. | |
| 2019/0305595 A1 | * | 10/2019 | Mantha | H02M 7/537 |

FOREIGN PATENT DOCUMENTS

KR 20100052110 A 5/2010

OTHER PUBLICATIONS

Chow et al. ('Design and evaluation of an active ripple filter using voltage injection.' In: 2001 IEEE 32nd Annual Power Electronics Specialists Conference. Vancouver: IEEE, Jun. 2001, pp. 390-397) (Year: 2001).*

(Continued)

*Primary Examiner* — Patrick C Chen
(74) *Attorney, Agent, or Firm* — Moser Taboada

(57) ABSTRACT

Methods and apparatus for reducing electromagnetic interference (EMI) in power conversion stage line filter are provided herein. The method, for example, includes determining an estimated ripple voltage or estimated ripple current using a predictive model, generating a ripple cancellation signal of opposite polarity to the estimated ripple voltage or ripple current, while compensating for at least one of magnitude or phase distortions in a signal path, and injecting the ripple cancellation signal into a power supply's line filter to reduce a ripple voltage.

17 Claims, 13 Drawing Sheets

(56) References Cited

OTHER PUBLICATIONS

Albert C. Chow et al. 'Design and evaluation of an active ripple filter using voltage injection.' In: 2001 IEEE 32nd Annual Power Electronics Specialists Conference. Vancouver: IEEE, Jun. 2001, pp. 390-397 [retrieved on Jun. 18, 2021]. Retrieved from <IEEE https://ieeexplore.ieee.org/document/954051>. See abstract and pp. 392-396.

International Search Report and Written Opinion dated Jul. 8, 2021 for PCT Application No. PCT/US2021/021518.

J. Ji et al., "Design and Precise Modeling of a Novel Digital Active EMI Filter", downloaded on Jun. 5, 2020 at 17:35:18 UTC from IEEE Xplore, pp. 3115-3120.

J. Ji et al., "A Control Method of Digital Active EMI Filter", downloaded on Jun. 5, 2020 at 16:55:14 UTC from IEEE Xplore, pp. 1141-1145.

D. Hamza et al., "Application and Stability Analysis of a Novel Digital Active EMI Filter Used in a Grid-Tied PV Microinverter Module", downloaded on Jun. 5, 2020 at 17:03:34 UTC from IEEE Xplore, pp. 2867-2874.

* cited by examiner

PREDICTIVE ACTIVE FILTER FOR EMI ATTENUATION

CROSS-REFERENCE TO RELATED APPLICATIONS

The present application claims the benefit of and priority to U.S. Provisional Patent Application Ser. No. 62/987,003, filed on Mar. 9, 2020, the entire contents of which is incorporated herein by reference.

BACKGROUND

1. Field of the Disclosure

Embodiments of the present disclosure generally relate methods and apparatus for power converter control and, more particularly, to methods and apparatus for controlling a power converter using active filtering techniques.

2. Description of the Related Art

Active filtering (e.g., electromagnetic interference (EMI) filtering) techniques to reduce conducted EMI in power converters are well known. Typically, such techniques are structured to first measure a ripple voltage or ripple current in a power conversion line filter. Thereafter, a cancellation signal of opposite polarity is injected with analog circuitry using feedback and/or feedforward paths. Conventional active EMI filter techniques can result in significant increase to a power supply's cost and complexity (e.g., parts count) due to the inclusion of voltage and/or current measurement circuitry, op-amps, buffer stages, and the requisite biasing supplies necessary for cancellation signal synthesis and injection. Furthermore, the conventional active filter techniques incur penalties to power conversion efficiency due to losses in analog circuitry operating with Class A or Class AB output stages. The inclusion of analog circuitry biasing supplies that derive power from the ac line can be especially troublesome in certain applications, in that they create additional noise coupling paths, or susceptibility to surge on the AC line voltage terminals.

In view of the foregoing, the inventors provide herein improved methods and apparatus for controlling conducted emissions from a power converter using active filtering techniques.

SUMMARY

In accordance with at least some embodiments of the present disclosure, a method for reducing electromagnetic interference (EMI) in power conversion stage line filter comprises determining an estimated ripple voltage or estimated ripple current using a predictive model, generating a ripple cancellation signal of opposite polarity to the estimated ripple voltage or estimated ripple current, while compensating for at least one of magnitude or phase distortions in a signal path and injecting the ripple cancellation signal into a power supply's line filter to reduce a ripple voltage.

In accordance with at least some embodiments of the present disclosure, a non-transitory computer readable storage medium having stored thereon instructions that when executed by a processor perform a method for reducing electromagnetic interference (EMI) in power conversion stage line filter. The method comprises determining an estimated ripple voltage or estimated ripple current using a predictive model, generating a ripple cancellation signal of opposite polarity to the estimated ripple voltage or estimated ripple current, while compensating for at least one of magnitude or phase distortions in a signal path and injecting the ripple cancellation signal into a power supply's line filter to reduce a ripple voltage.

In accordance with at least some embodiments of the present disclosure, an apparatus for reducing electromagnetic interference (EMI) in power conversion stage line filter comprises an active filter management and control module configured to determine an estimated ripple voltage or estimated ripple current using a predictive model, generate a ripple cancellation signal of opposite polarity to the estimated ripple voltage or estimated ripple current, while compensating for at least one of magnitude or phase distortions in a signal path, and inject the ripple cancellation signal into a power supply's line filter to reduce a ripple voltage

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only a typical embodiment of this disclosure and are therefore not to be considered limiting of its scope, for the disclosure may admit to other equally effective embodiments.

DETAILED DESCRIPTION

Figure 1:
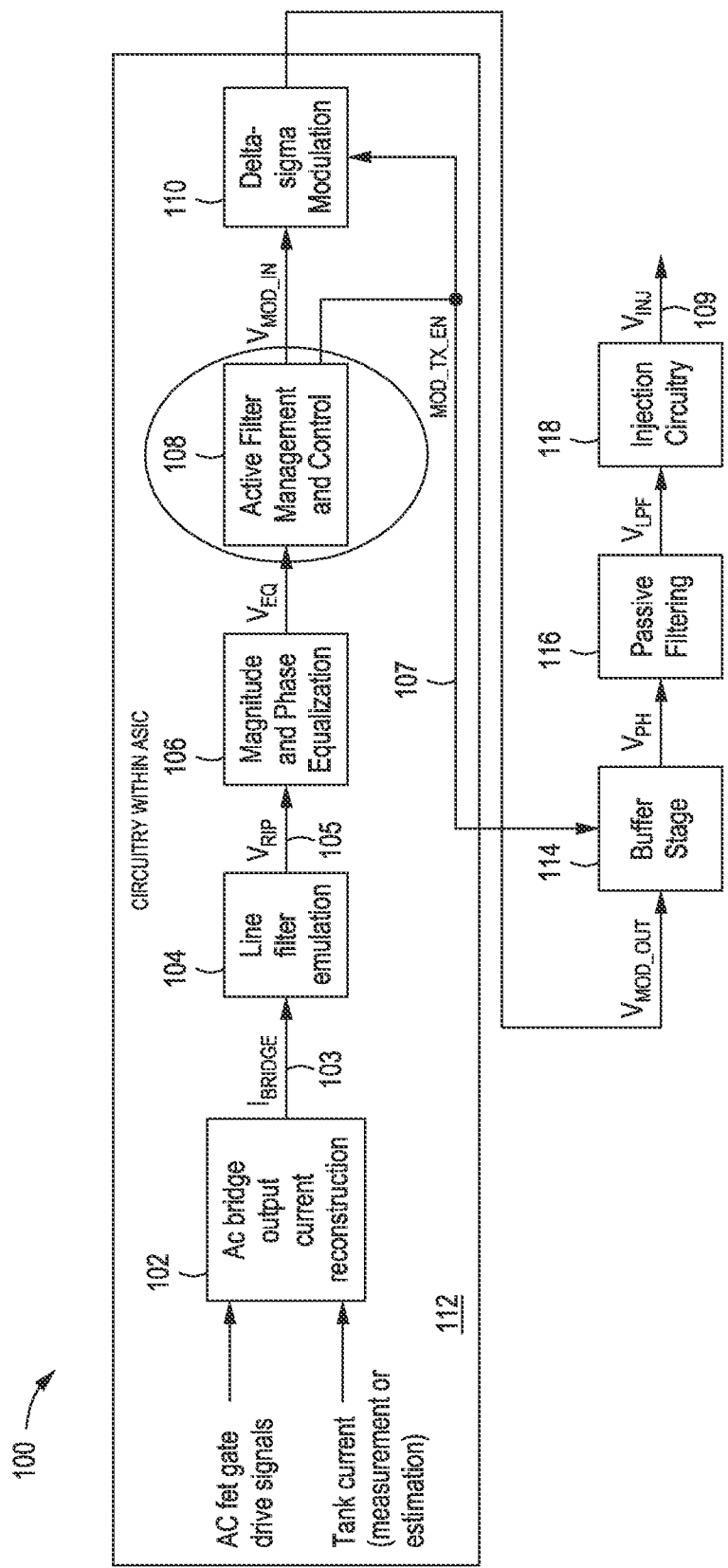
FIG. 1 is a diagram of an active EMI filter, in accordance with at least some embodiments of the present disclosure.

In accordance with the present disclosure, methods and apparatus for controlling a power converter using active filtering techniques is described herein. For example, the present disclosure relates to active electromagnetic interference (EMI) filtering techniques, e.g., using predictive, feedforward synthesis of a cancellation signal in the digital domain. The active filtering techniques described herein are configured to reduce conducted differential EMI, e.g., from about a 100 kHz to about 1 MHz frequency band. Successful attenuation of emissions allows for the removal of a single stage (e.g., one choke and one X-cap (transformer capacitor) in an existing ac line filter circuit. Alternatively, a multistage filter may be used, but with down-sized components, as the low-frequency emissions would be predominantly attenuated by the active filter.

The active EMI filtering techniques described herein are fully configurable via firmware parameter settings for evolving designs (e.g., higher voltage/current/power level inverter platforms). Unlike conventional methods and apparatus, the methods and apparatus described herein are configured to predict a ripple voltage and/or current through discrete-time modeling techniques. For example, a fully digital delta-sigma modulation module (modulator) is used in conjunction with passive LC filtering to provide a power-efficient method for injection of a cancellation signal. Cancellation of the predominant differential frequencies in a line filter through active filtering techniques allows for potential size and cost reduction of the passive line filter components. Additional benefits can also be derived from easing an engineering effort required to pass applicable EMI compliance standards.

Moreover, additional circuitry, typically, used by conventional active EMI filtering techniques, and the negative impacts associated therewith, are minimized, if not eliminated, by using the predictive feedforward architecture described herein, as all of the control circuitry resides digitally (e.g., within a pre-existing control ASIC or DSP). In an embodiment of the present disclosure, only a low-cost modulator output filter, and a small-signal injection transformer are added to the parts count of the power conversion equipment.

Due to the high-efficiency and cost-sensitive nature of modern power conversion equipment, the active filter techniques described herein are low-power and inexpensive and include a delta-sigma modulation module and low-loss passive filtering. The delta-sigma modulation module with passive filtering essentially creates a Class-D amplifier that allows for low-loss operation, while injecting a ripple cancellation signal into the line filter. As noted above, much of the required circuitry can reside within an ASIC or digital signal processor (DSP), allowing for a low-cost, low parts count implementation.

Moreover, there is no need to develop additional biasing supplies for analog circuitry, as with conventional EMI filtering techniques.

FIG. 1 is a diagram of an active EMI filter 100, in accordance with at least some embodiments of the present disclosure. As shown in FIG. 1, the active EMI filter 100 includes an AC bridge output current reconstruction module 102, a line filter emulation module 104, a magnitude and phase equalization module 106, an active filter management and control module 108, a delta-sigma modulation module 110, all of which are part of the circuitry of the control ASIC 112. The AC bridge output current reconstruction module 102 receives one or more AC FET gate drive signals and/or tank current signals (e.g., measurement or estimation). The delta-sigma modulation module 110 receives an input signal (e.g., $V_{mod\_in}$) from the active filter management and control module 108 and transmits an output (e.g., $V_{mod\_out}$) to a buffer stage 114 that transmits an output signal (e.g., $V_{ph}$) to a passive filtering module 116 (e.g., a passive LC ladder filter) that transmits an output signal (e.g., VW to injection circuitry 118 that transmits an output signal (e.g., $V_{inj}$ signal 109) to an injection node in the power converter's line filter (not shown).

In accordance with the present disclosure, a first step in formulating an appropriate ripple voltage cancellation signal is to reconstruct an ac bridge output current from signals within the ASIC. Using pre-existing information within the control ASIC 112 to predict ripple voltage (and/or current) is part of an over-arching strategy that avoids the cost and overhead of directly measuring the ripple.

Figure 2:
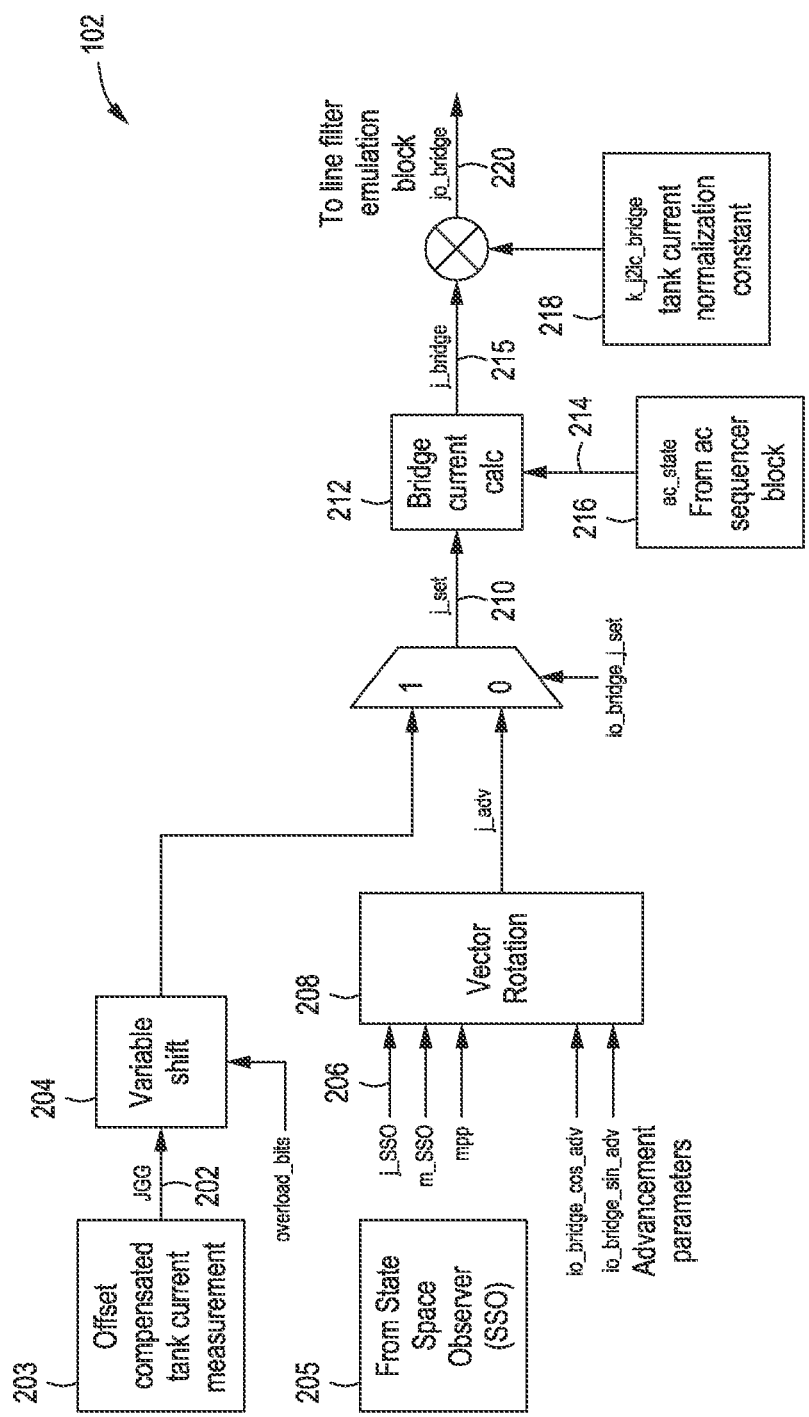
FIG. 2 is diagram of a bridge current reconstruction logic module, in accordance with at least some embodiments of the present disclosure.

FIG. 2 is a diagram of the AC bridge output current reconstruction module 102, in accordance with at least some embodiments of the present disclosure. The AC bridge output current reconstruction module 102 can be configured to use either an offset-compensated tank current measurement ($j_{oc}$) 202, which is transmitted from an offset compensated tank current measurement module 203 to a variable shift module 204, or an estimated resonant current ($j_{\_sso}$) 206, which is transmitted from a state-space observer (SSO) module 205 to a vector rotation module 208. Use of the offset-compensated tank current measurement (joe) 202 has the advantage of using a signal that is not subject to estimation errors within the state-space observer (SSO) module 205. Alternately, the bridge current reconstruction logic module 200 can be configured to use the estimated resonant current ($j_{\_sso}$) 206 for calculation of the output bridge current waveform, which allows for phase advancement of a tank current signal. Such advancement is advantageous to partially cancel delay in other parts of the active filter signal path.

A selected $j_{\_sel}$ 210 signal is input to a bridge current calculation block 212, which selectively passes through, inverts and/or zeros out the $j_{\_sel}$ 210 signal (e.g., $j_{\_bridge}$ 215), depending on a value of ac state signal 214 received from an ac sequencer module 216. The $j_{-bridge}$ 215 signal then gets normalized at a tank current normalization module 218 to represent amps of an estimated bridge output current (e.g., $i_{o-bridge}$ 220 signal) that gets transmitted to the line filter emulation module 104 of the control ASIC 112 for further processing.

Figure 3:
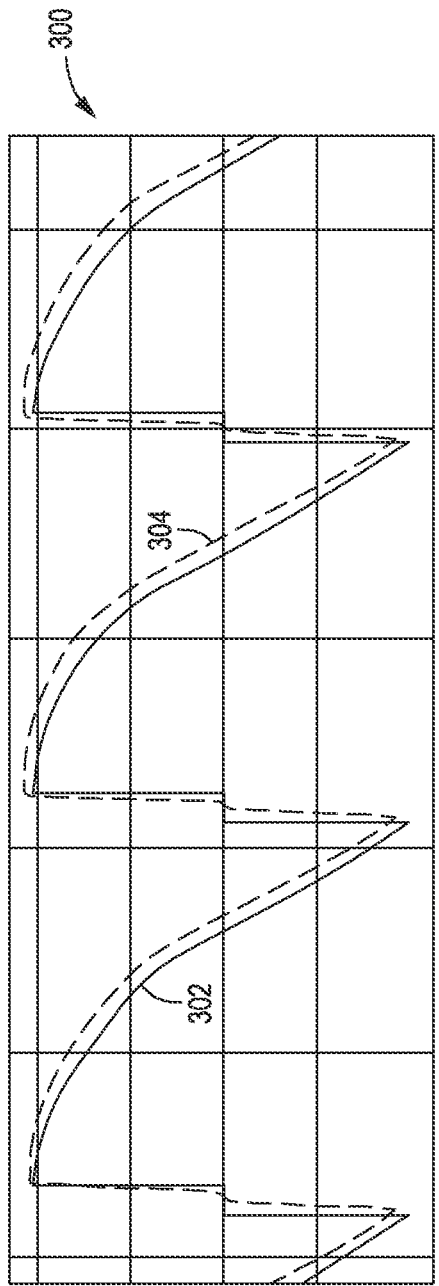
FIG. 3 is diagram of a simulation of output current reconstruction, in accordance with at least some embodiments of the present disclosure.

FIG. 3 is diagram 300 of a simulation of output current reconstruction, in accordance with at least some embodiments of the present disclosure. For example, when the phase advancement parameters are configured for 80 ns advance, the resulting simulation waveforms are shown in FIG. 3. For example, the reconstructed bridge current 302 leads the simulated output current 304. The small advance is useful for compensating some of the phase delay incurred as the cancellation signal passes through the active EMI filter 100 and the passive LC ladder filter (e.g., the passive filtering module 116).

In accordance with the present disclosure, a second step in formulating an appropriate ripple voltage cancellation signal is to predict the ripple voltage at the chosen injection point within the line filter. The re-constructed bridge output current can be applied to a state-space representation of a simplified line filter model. For example, the line filter emulation module 104 updates the state-space model in real-time, thus providing an estimate of the ripple voltage or current, which needs to be cancelled.

Figure 4:
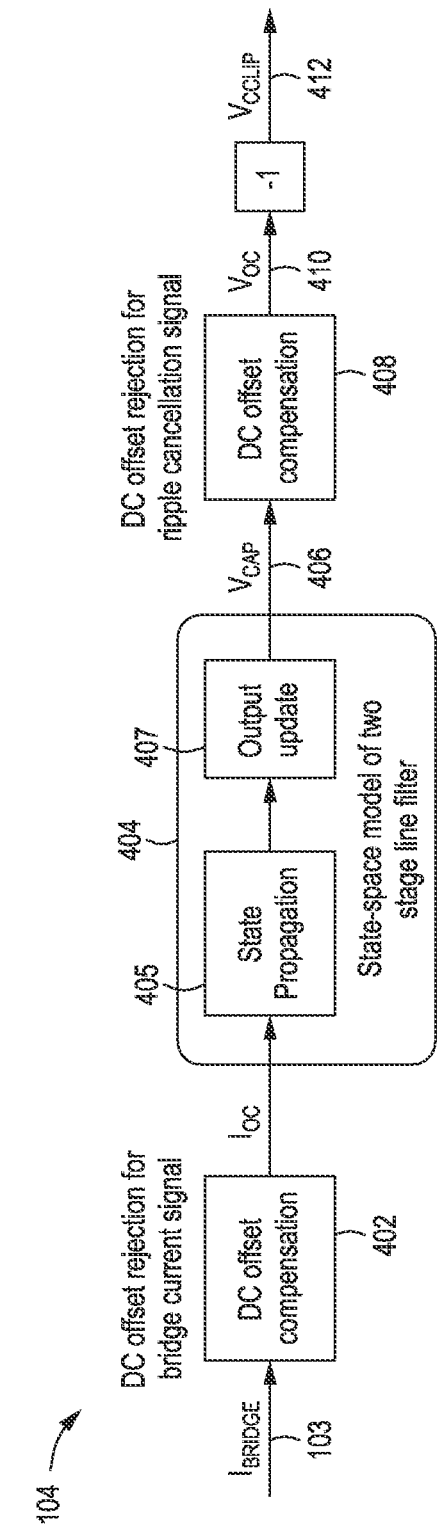
FIG. 4 is a diagram of a line filter emulation module, in accordance with at least some embodiments of the present disclosure.

FIG. 4 is a diagram of the line filter emulation module 104, in accordance with at least some embodiments of the present disclosure. The line filter emulation module 104 accepts/receives the reconstructed bridge current $I_{BRIDGE}$ input signal 103 (FIG. 1). The reconstructed bridge current $I_{BRIDGE}$ input signal 103 is stripped of DC offset by a DC offset compensation module 402, and then applied to a line filter state-space model 404 for real time update. The line filter state-space model 404 comprises a two-stage filter including a state propagation state 405 and an output update stage 407. The line filter state-space model 404 outputs a signal $V_{CAP}$ 406 that represents an estimated ripple voltage that needs to be cancelled. In at least some embodiments, the signal $V_{CAP}$ 406 can, optionally, be subjected to a second DC offset compensation module 408 (e.g., $V_{oc}$ 410) before being inverted for use as the ripple cancellation signal $V_{COMP}$ 412.

Figure 5:
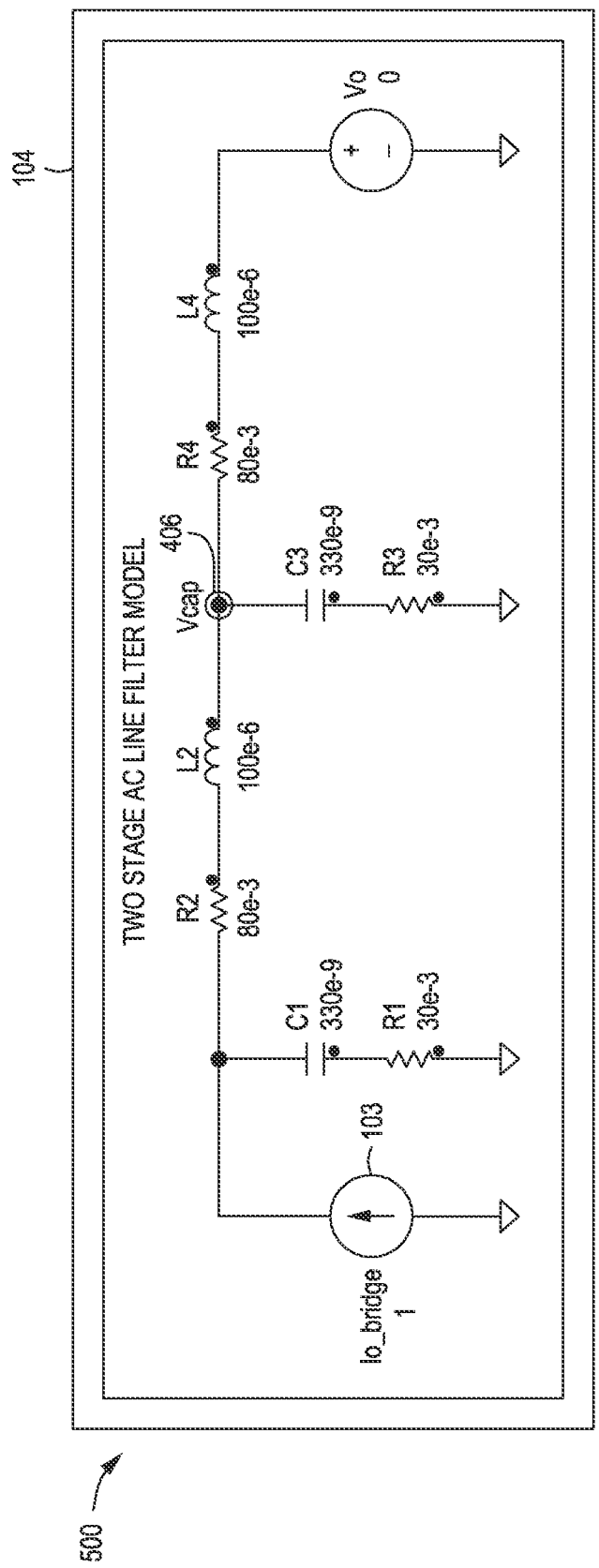
FIG. 5 is a diagram of a simplified line filter emulation module of FIG. 4 for voltage ripple estimation, in accordance with at least some embodiments of the present disclosure.

FIG. 5 is a diagram 500 of a simplified line filter emulation module of FIG. 4 for voltage ripple estimation, in accordance with at least some embodiments of the present disclosure. The input signal is the reconstructed bridge current (e.g., reconstructed bridge current $I_{BRIDGE}$ input signal 103) from an upstream RTL block (e.g., AC bridge output current reconstruction module 102). The output signal is the signal $V_{CAP}$ 406, which represents the voltage across a capacitor in series with a transformer (e.g., cancellation signal injection transformer). For example, the model assumes that an injection transformer (not shown) is in series with a capacitor $C_3$ branch and injects a signal that is of opposing polarity to an estimated signal $V_{CAP}$ 406 signal, such that the net ripple voltage across the line filter is nulled to zero. In the embodiment of FIG. 5, in a first branch a resistor $R_1$ is connected in series with a capacitor $C_1$, which are connected in parallel with a resistor $R_2$ connected in series with an inductor $L_2$, which are connected in parallel with a resistor $R_3$ connected in series with a capacitor $C_3$, which are connected in parallel with a resistor $R_4$ connected in series with an inductor La. The resistors, capacitors, and inductors can have any value suitable for performing the methods described herein.

In at least some embodiments, with respect to an ac-component of the signal $V_{CAP}$ 406, $V_o=0$ to suppress the DC and line frequency components of capacitor voltage. $V_o$ is then no longer represented in the model, and a right side of the inductor $L_4$ is grounded. With this in mind, a continuous-time state-space model of the line filter emulation module 104 is given by:

$$\frac{d}{dt}\begin{bmatrix} i_{C1} \\ v_{L2} \\ i_{C3} \\ v_{L4} \end{bmatrix} = \begin{bmatrix} 0 & -1/C_1 & 0 & 0 \\ 1/L_2 & -(R_1+R_2+R_3)/L_2 & -1/L_2 & R_3/L_2 \\ 0 & 1/C_3 & 0 & -1/C_3 \\ 0 & R_3/L_4 & 1/L_4 & -(R_3+R_4)/L_4 \end{bmatrix} \cdot \begin{bmatrix} v_{C1} \\ i_{L2} \\ v_{C3} \\ i_{L4} \end{bmatrix} + \begin{bmatrix} 1/C_1 \\ R_1/L_2 \\ 0 \\ 0 \end{bmatrix} \cdot i_{BRIDGE}$$

$$v_{CAP} = \begin{bmatrix} 0 & R_3 & 1 & -R_3 \end{bmatrix} \cdot \begin{bmatrix} v_{C1} \\ i_{L2} \\ v_{C3} \\ i_{L4} \end{bmatrix} + [0] \cdot i_{BRIDGE}$$

The above continuous-time model was discretized at an appropriate control algorithm update rate, with resulting matrix coefficients written to the active filter management and control module 108 for real-time estimation of the ripple voltage. The resulting state-space model is a $4^{th}$-order and can accommodate refinements, such as virtual damping of line filter resonant peaks, with little extra effort, if required.

Figure 6:
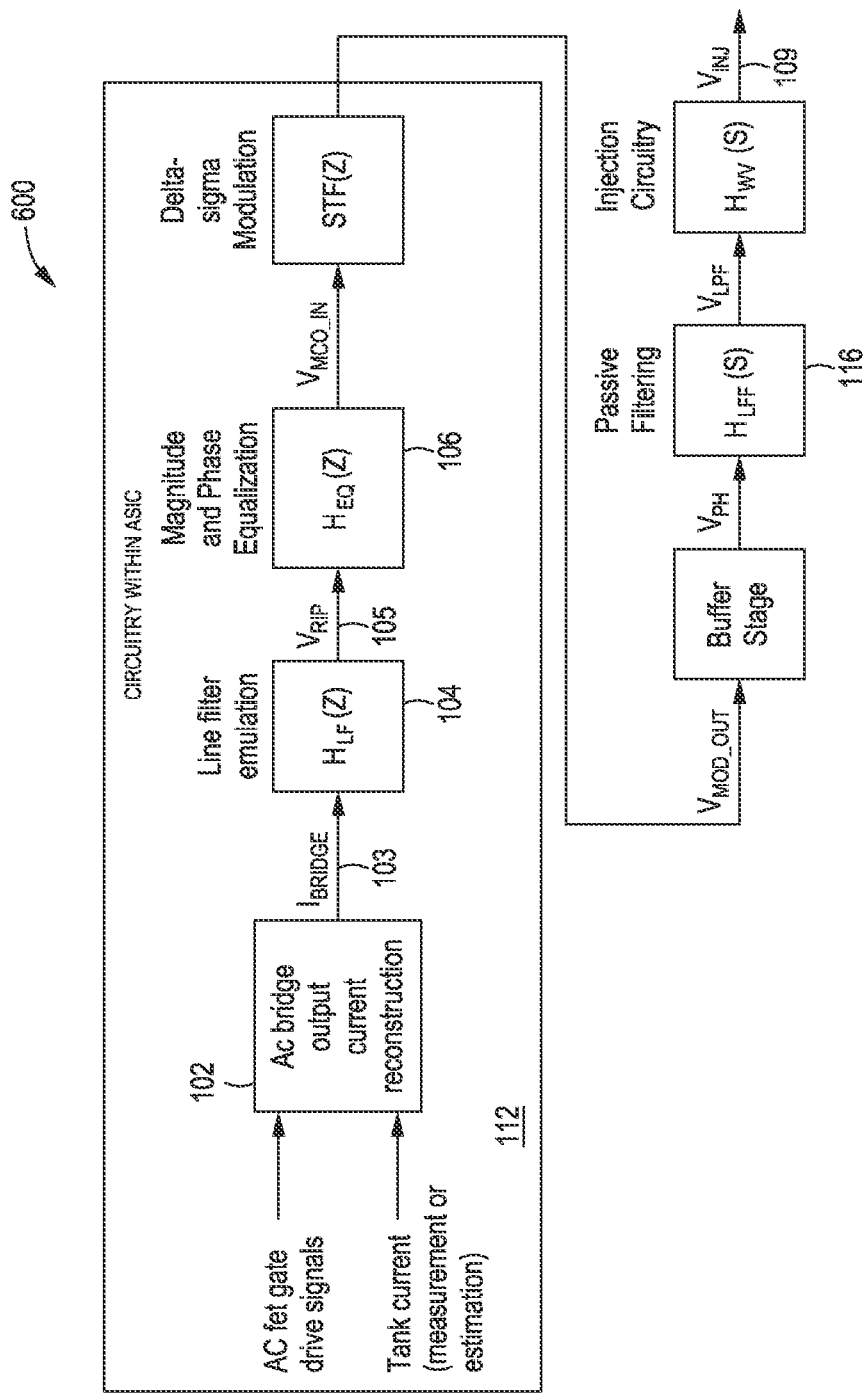
FIG. 6 is a diagram of ripple cancellation signal path, in accordance with at least some embodiments of the present disclosure.

FIG. 6 is a diagram 600 of a ripple cancellation signal path, in accordance with at least some embodiments of the present disclosure. An approximate real-time prediction of the ripple voltage $V_{RIP}$ 105 that needs to be cancelled can be obtained in the first two modules, e.g., the AC bridge output current reconstruction module 102 and the line filter emulation module 104. For example, to obtain complete (ideal) cancellation, $V_{RIP}+V_{INJ}=0$, which, in turn requires Equation (1):

$$H_{EQ}(z) = -STF^{-1}(z) \cdot H_{LPF}^{-1}(z) \cdot H_{INJ}^{-1}(z) \tag{1}$$

The inversion of the transfer function will only be stable if the respective transfer functions are minimum phase, e.g., all continuous-time zeros must be in the left half of the s-plane (alternately all discrete-time zeros are within the unit circle in the z-plane). The transfer function that requires a majority of phase equalization is that of the passive low-pass filter $H_{LPF}(s)$, e.g., the passive filtering module 116. The first step in determining the equalization filter parameters is to formulate a continuous-time state-space description of the $4^{th}$ order LC ladder filter with termination $R_T$ shown below:

$$\frac{d}{dt}\begin{bmatrix} i_{L1} \\ v_{C2} \\ i_{L3} \\ v_{C4} \end{bmatrix} = \begin{bmatrix} 0 & -1/L_1 & 0 & 0 \\ 1/C_2 & 0 & -1/C_2 & 0 \\ 0 & 1/L_3 & 0 & -1/L_3 \\ 0 & 0 & 1/C_4 & -1/(R_T \cdot C_4) \end{bmatrix} \cdot \begin{bmatrix} i_{L1} \\ v_{C2} \\ i_{L3} \\ v_{C4} \end{bmatrix} + \begin{bmatrix} 1/L_1 \\ 0 \\ 0 \\ 0 \end{bmatrix} \cdot v_{IN}$$

$$v_{OUT} = \begin{bmatrix} 0 & 0 & 0 & 1 \end{bmatrix} \cdot \begin{bmatrix} i_{L1} \\ v_{C2} \\ i_{L3} \\ v_{C4} \end{bmatrix} + [0] \cdot v_{IN}$$

The continuous-time state-space model of the singly terminated filter is transformed to a discrete-time state-space representation using the bilinear transform. The model is augmented by cascading the signal transfer function (STF (z)) of the delta-sigma modulation module 110 in series with the passive filtering module 116 ($H_{LPF}$(s)), then inverted at the injection circuitry 118 (e.g., $H_{INJ}$ (s)) to yield the equalization block transfer function.

In accordance with the present disclosure, the above approach provides correct phase advance and magnitude adjustments within the signal passband, e.g., from about 100 kHz to about 1 MHz, but might exhibit excessive magnitude response at higher frequencies. In simulation using fixed point math, the quantization noise riding on the input signal was amplified to the point where performance was compromised.

Figure 7:
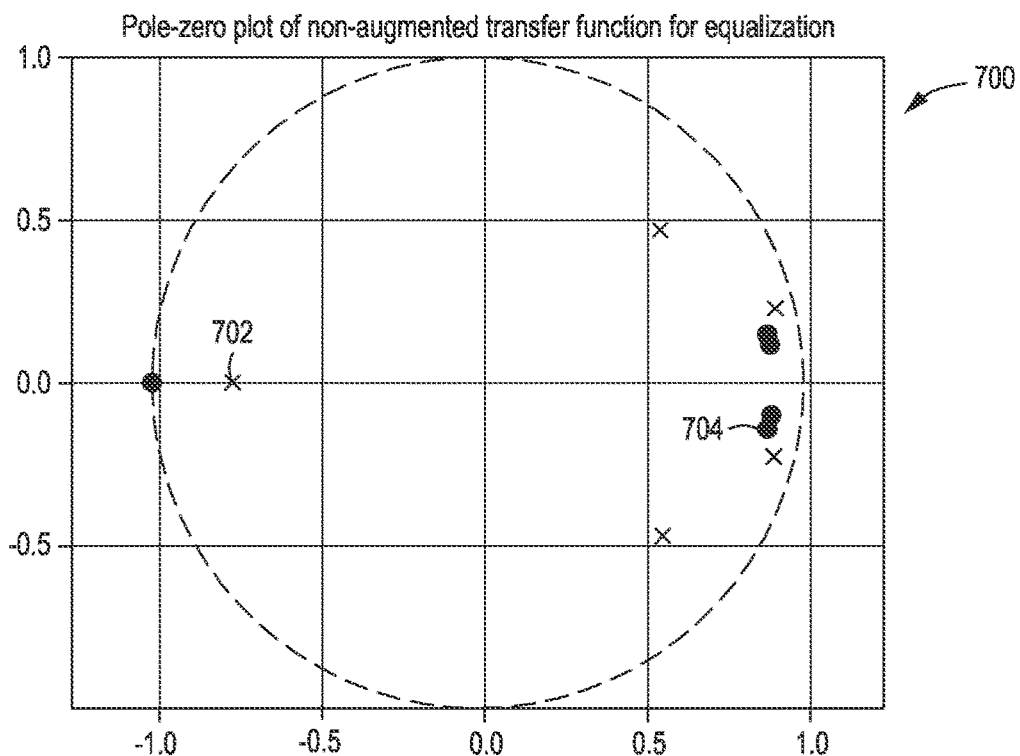
FIG. 7 is a diagram of pole-zero location in z-plane for equalization filter, in accordance with at least some embodiments of the present disclosure.

In accordance with at least some embodiments, an alternate approach can be used for synthesis of an equalization filter (e.g., the passive filtering module 116). The inventors have found that a 5th-order filter structure was found to be satisfactory, and a general idea of pole/zero locations was established. Search algorithms can be utilized to optimize pole-zero locations over various regions, given acceptance criteria such as passband gain variation, desired phase advance, and high-frequency gain. A typical set of pole-zero locations for the equalization filter is shown in the diagram 700 of FIG. 7. For example, pole locations 702 are represented by crisscrosses and the zero 704 locations are represented by the circles.

The active filter management and control module 108 is configured to provide the following control features: 1) enable/disable the active EMI filter 100 under direct firmware control; 2) enable/disable the active EMI filter 100 by monitoring the short-term average of the square of the ripple voltage estimate, and comparing it to a threshold parameter, e.g., essentially gate the filter when the estimated ripple power exceeds a programmable threshold; 3) provide a raised-cosine envelope blend profile for an injected cancellation signal when enabling or disabling the active EMI filter 100. The rise time of the blend profile is programmable so as to avoid exciting line filter resonances in the 10 kHz to 50 kHz region, which becomes especially advantageous if the modulator is gated on/off at a rate of multiple times per line cycle; and 4) provide a MOD_TX_EN signal 107 (FIG. 1) to both the delta-sigma modulation module 110 and the buffer stage 114.

When the active EMI filter 100 is disabled, the delta-sigma modulation module 110 ceases data output stream (e.g., power savings for the buffer stage 114), and the analog switches in the buffer stage 114 will open, thus allowing the DC blocking caps in the passive filtering module 116 to settle at a proper bias condition, which, in turn, avoids a pop in the injected cancellation signal every time the modulator output is enabled or disabled; and 5) optionally provides for direct firmware control over attenuation of the cancellation signal.

Figure 8:
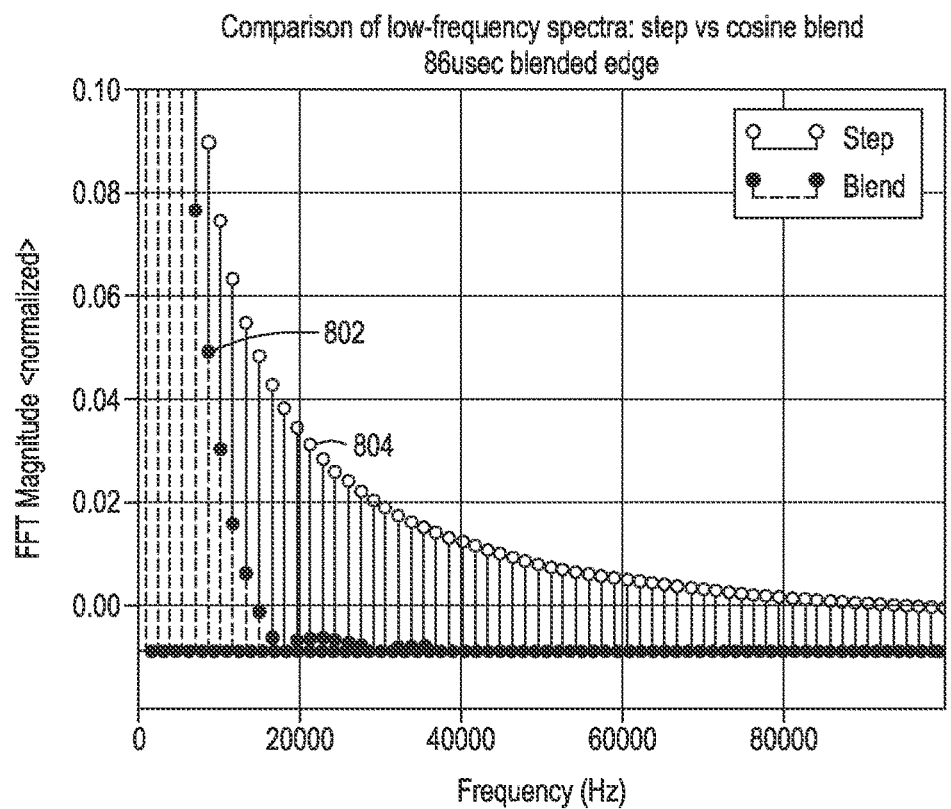
FIG. 8 is a graph of frequency content of step vs. raised cosine blend, in accordance with at least some embodiments of the present disclosure.

A programmable parameter can be used to control a duration of the blend profile, which, in turn, influences a low-frequency content of the cancellation signal during the on/off transient (see FIG. 8, which shows a frequency content of step 802 vs. raised cosine blend 804). An edge rate of about 80 μsec to about 100 μsec has been found to be sufficient to avoid exciting the line filter resonant modes. For example, in at least some embodiments, an edge rate of about 86 μsec has been found to be sufficient to avoid exciting the line filter resonant modes.

Figure 9:
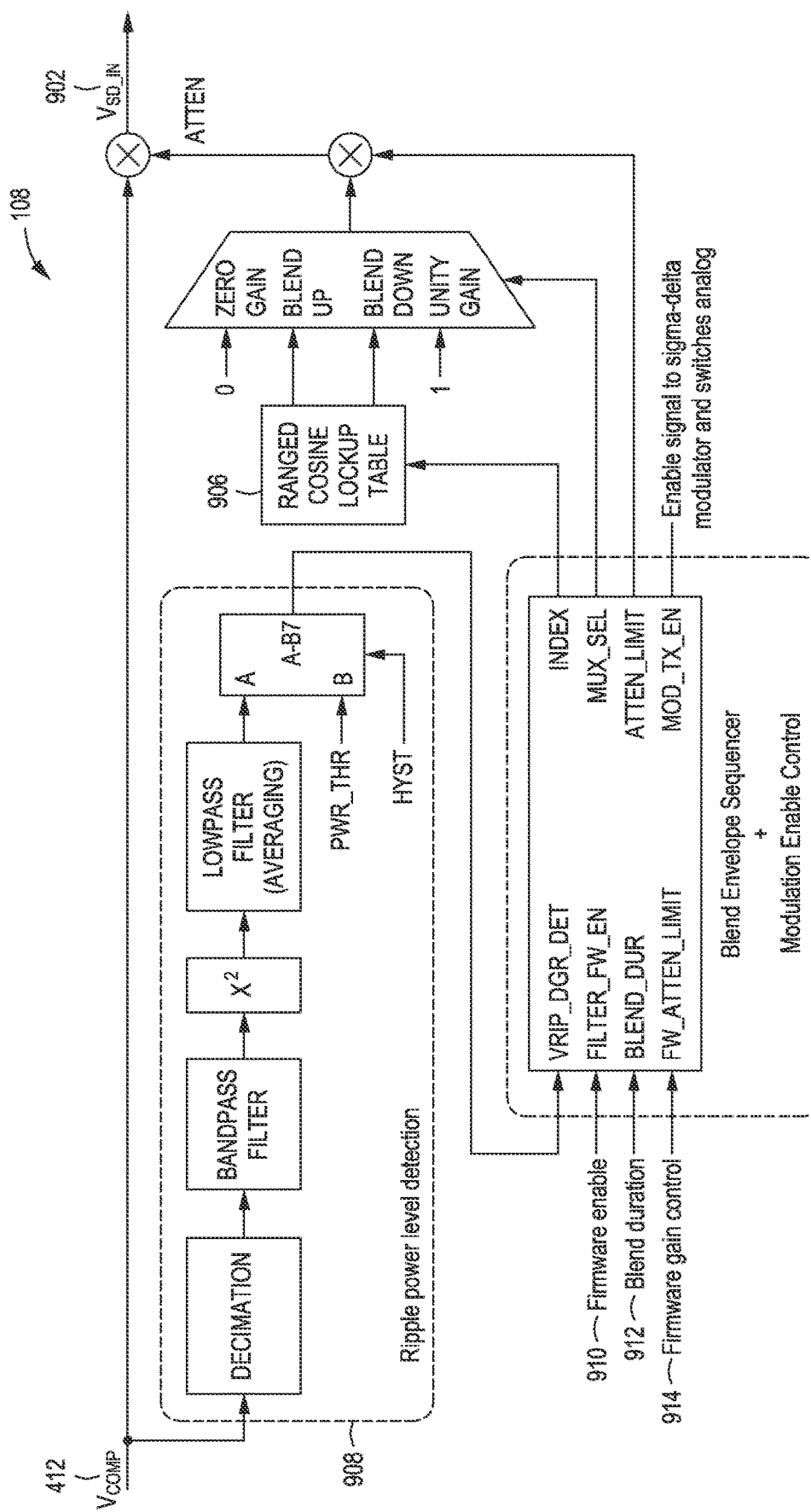
FIG. 9 is a diagram of an active filter management and control module, in accordance with at least some embodiments of the present disclosure.

FIG. 9 is a diagram of the active filter management and control module 108, in accordance with at least some embodiments of the present disclosure. The active filter and control module 108 (e.g., a processor) is programmed to carry out the methods described herein. The active filter and control module 108 can include a central processing unit, a memory (e.g., a nontransitory computer readable storage medium), and support circuitry utilized to control the process sequence of the active EMI filter 100. The central processing unit may be any form of general-purpose computer processor that may be used in an industrial setting. The software routines (e.g., executable instructions stored) can be stored in the memory, such as random-access memory, read only memory, floppy, or hard disk drive, or other form of digital storage. The support circuitry is conventionally coupled to the central processing unit and may include cache, clock circuits, input/output systems, power supplies, and the like.

Figure 10:
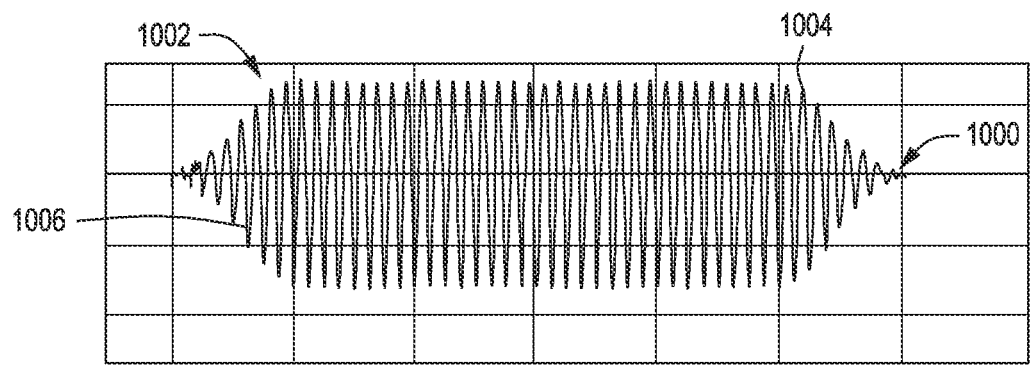
FIG. 10 is diagram of a simulation of modulator enable/disable using buffer stage analog switches to allow pre-bias of DC blocking caps, in accordance with at least some embodiments of the present disclosure.

The ripple cancellation signal $V_{COMP}$ 412 is a cancellation signal from the line filter emulation module 104. The ripple cancellation signal $V_{COMP}$ 412 is the negative of the estimated voltage ripple that needs to be cancelled, subject to magnitude and/or phase corrections from the magnitude and phase equalization module 106. The magnitude of the ripple cancellation signal $V_{COMP}$ 412 is modified by a variable attenuation factor, then routed to the delta-sigma modulation module 110 as $VSD_{IN}$ input signal 902. A state-machine based sequencer 904 (blend envelope sequencer) selects either zero gain, unity gain, or index through a raised cosine lookup table 906 to provide smooth transitions between zero and unity. See graph of FIG. 10 at 1000 and 1002, respectively, in which lines 1004 represents a simulated modulator input signal and lines 1006 represent a simulated injection signal at the modulator output filter's termination resistor.

In addition, the sequencer 904 manages assertion of the MOD_TX_EN signal 107 that enables/disables the delta-sigma modulation module 110 and buffer stage 114 analog switches.

A ripple power level detection block 908 averages the square of the ripple cancellation signal $V_{COMP}$ 412, then compares the average with a threshold. The ripple power level detection block 908 can, optionally, be configured to enable/disable the modulator output (e.g., the delta-sigma modulation module 110).

Firmware 910 can optionally enable/disable the modulator output (e.g., independent of the ripple power level detection block 908). A blend duration 912 parameter controls how fast the sequencer 904 indexes through the raised cosine lookup table 906, thus influencing the frequency content of the modulation signal. A firmware gain control 914 can also be used to adjust overall gain of the signal to be applied to the modulator input.

The active EMI filtering techniques described herein are fully configurable via firmware parameter settings for evolving designs (e.g., higher voltage/current/power level inverter platforms).

Figure 11:
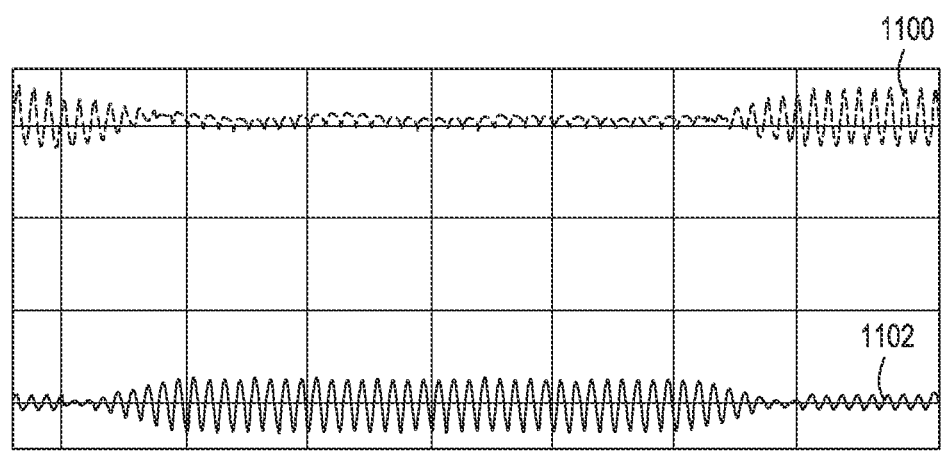
FIG. 11 is a diagram of a simulation of ripple voltage across a line filter during modulator enable/disable transient, in accordance with at least some embodiments of the present disclosure.

The simulation plot of FIG. 11 shows the attenuation of a ripple voltage 1100 across the active EMI filter 100 when an injected signal 1102 is applied in series with the transformer capacitor $C_3$. There is about 15 dB reduction in ripple voltage when the active EMI filter 100 is on.

Figure 12:
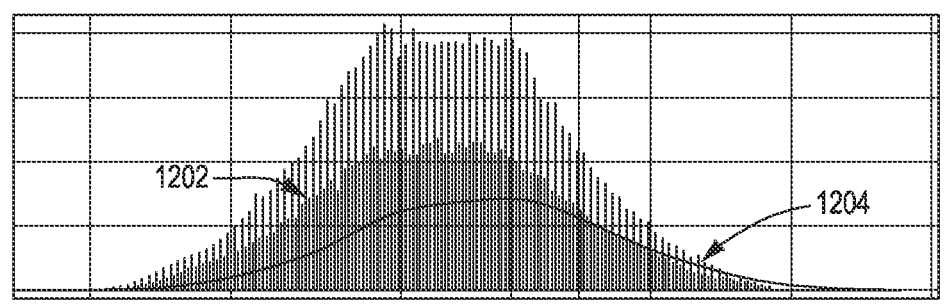
FIG. 12 is a diagram of a simulation of an instantaneous ripple power waveform and averaged ripple power waveform, in accordance with at least some embodiments of the present disclosure.

The modulator enable signal can be controlled by monitoring an average ripple power level and comparing the average ripple power level with a programmable threshold (FIG. 12). The trace 1202 of FIG. 12 shows the waveform of instantaneous ripple power, when output current from the inverter is first ramped up, then ramped down. The line 1204 shows the averaged ripple power after low-pass filtering the instantaneous power waveform. The line 1204 is then applied to a hysteretic comparator to make modulator enable/disable decisions.

Figure 13:
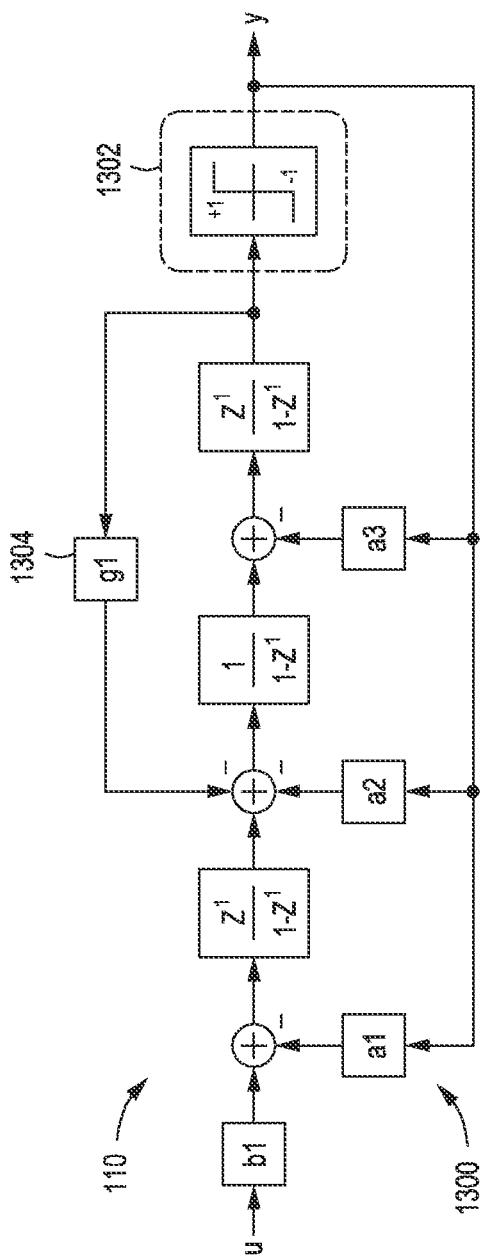
FIG. 13 is a diagram of components of the $3^{rd}$-order delta-sigma module, in accordance with at least some embodiments of the present disclosure.

FIG. 13 is a diagram of components of the delta-sigma modulation module 110, in accordance with at least some embodiments of the present disclosure. The delta-sigma modulation module 110 is a $3^{rd}$-order structure 1300 with a single-bit quantizer 1302. The delta-sigma modulation module 110 has a feedback gain module 1304 across the last two integrator stages, e.g., a cascaded resonator with distributed feedback (CRFB) structure.

Figure 14:
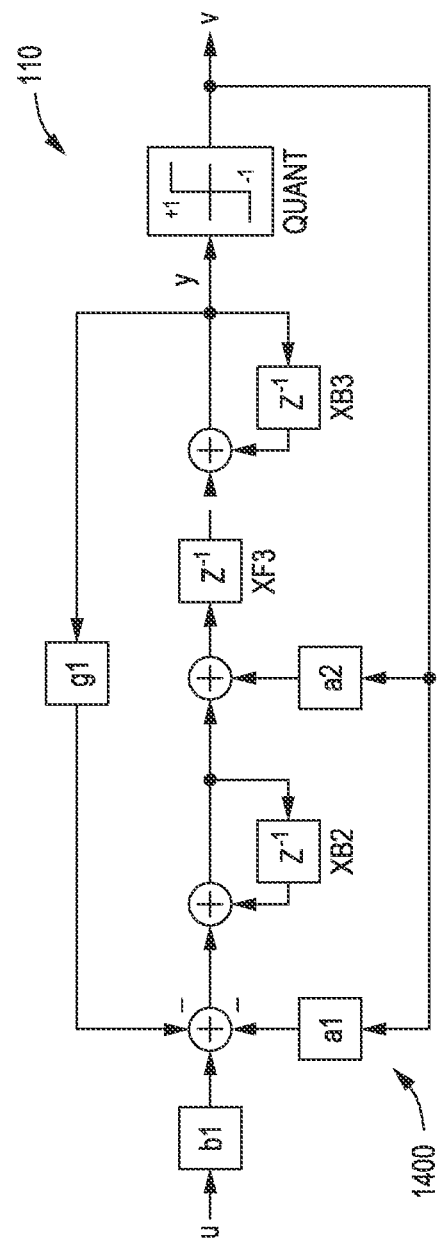
FIG. 14 is a diagram of components of the $2^{nd}$-order delta-sigma module, in accordance with at least some embodiments of the present disclosure.

In at least some embodiments, the delta-sigma modulation module 110 includes one or more configuration mode bits to effectively revert the modulator topology from $3^{rd}$-order structure 1300 to $2^{nd}$-order structure 1400 (see FIG. 14). The 2nd-order modulator inherently has a more robust recovery from input overdrive conditions, while the $3^{rd}$-order modulator can potentially realize higher signal-to-quantization-noise-ratio (SQNR) than the $2^{nd}$-order variant. The mode bit configuration of the modulator order is convenient for optimization of modulator performance in a given application.

In at least some embodiments, the input dynamic range can be scaled by setting an effective gain of the single-bit quantizer 1302 specified by a programmable parameter, thus allowing a user to tune the input range appropriately given the magnitude of the estimated ripple in the active EMI filter 100. Higher SQNR can be obtained when a large portion of the input range is fully exercised but input signal overdrive is avoided to maintain modulator stability.

The buffer stage 114 (FIG. 1) provides up to several hundred mW of drive capability for the injected ripple voltage $V_{RIP}$ 105 signal. In one embodiment, the buffer stage 114 is capable of driving about 150 mA while maintaining about 3.0 V drive level on an output pin (not shown) of the buffer stage 114. In other embodiments, sufficient drive capability may be built into the control module 108, so as to avoid use of an external buffer chip. For single tone signal injection, the buffer stage 114 is configured to deliver about 225 mW into a 20-ohm resistive termination on an output of the passive filtering module 116. Additionally, the buffer stage 114 includes one or more analog switches (not shown) that advantageously pre-bias the output lines of the delta-sigma modulation module 110 to avoid the pop, e.g., upon enabling or disabling the delta-sigma modulation module 110.

A passive $4^{th}$-order low-pass LC ladder filter (e.g., the passive filtering module 116) is configured to recover the ripple voltage $V_{RIP}$ 105 signal embedded in the delta-sigma modulation module 110. In at least some embodiments, a Bessel filter response can be selected to give a close approximation to linear phase within the passive filtering module 116 passband.

The design of the passive low-pass filter requires consideration of an LC ladder termination impedance. For example, the termination impedance is predominantly resistive, and constant over a signal bandwidth. For example, when the termination impedance is constant over a signal bandwidth, a magnitude and phase response of the passive low-pass filter is known and can be compensated for within the magnitude and phase equalization module 106, as described above.

Figure 15:
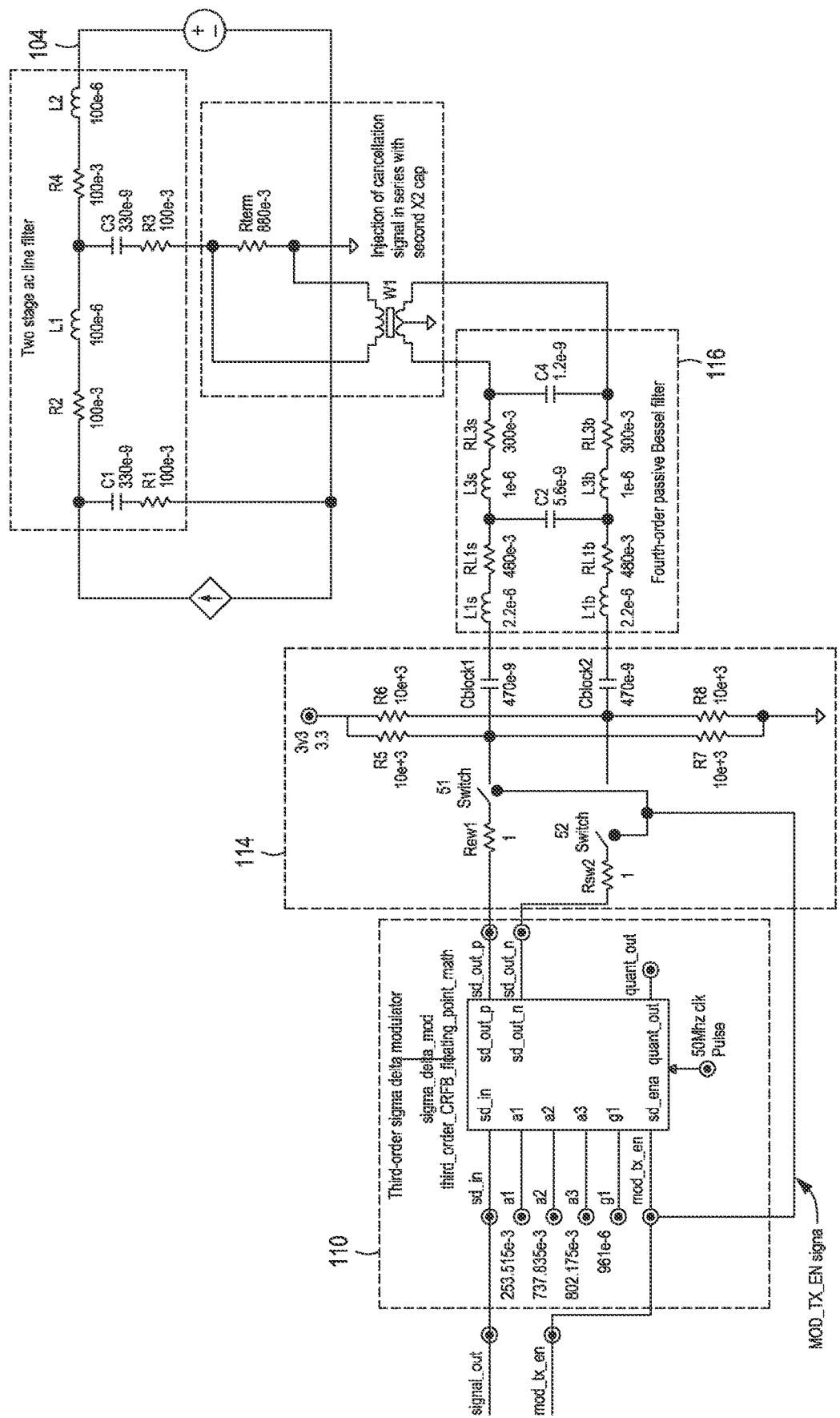
FIG. 15 is a schematic of a power conversion stage line filter including injection circuitry, in accordance with at least some embodiments of the present disclosure.

Additionally, a key design constraint for the injection circuitry 118 is obtaining an approximation of a constant terminating resistance. With this purpose in mind, the injection circuitry 118 should be arranged such that a driving point impedance looking into the injection nodes 1502 of the injection circuitry 118 is relatively high compared to the desired termination impedance (FIG. 15). One or more appropriate termination resistors 1504 can be placed across the injection nodes 1502 to swamp out driving point impedance variations.

In accordance with at least some embodiments of the present disclosure, as described above the injection circuitry 118 can include a cancellation signal injection transformer 1506 located in series with the capacitor $C_3$ in the line filter emulation module 104.

Figure 16:
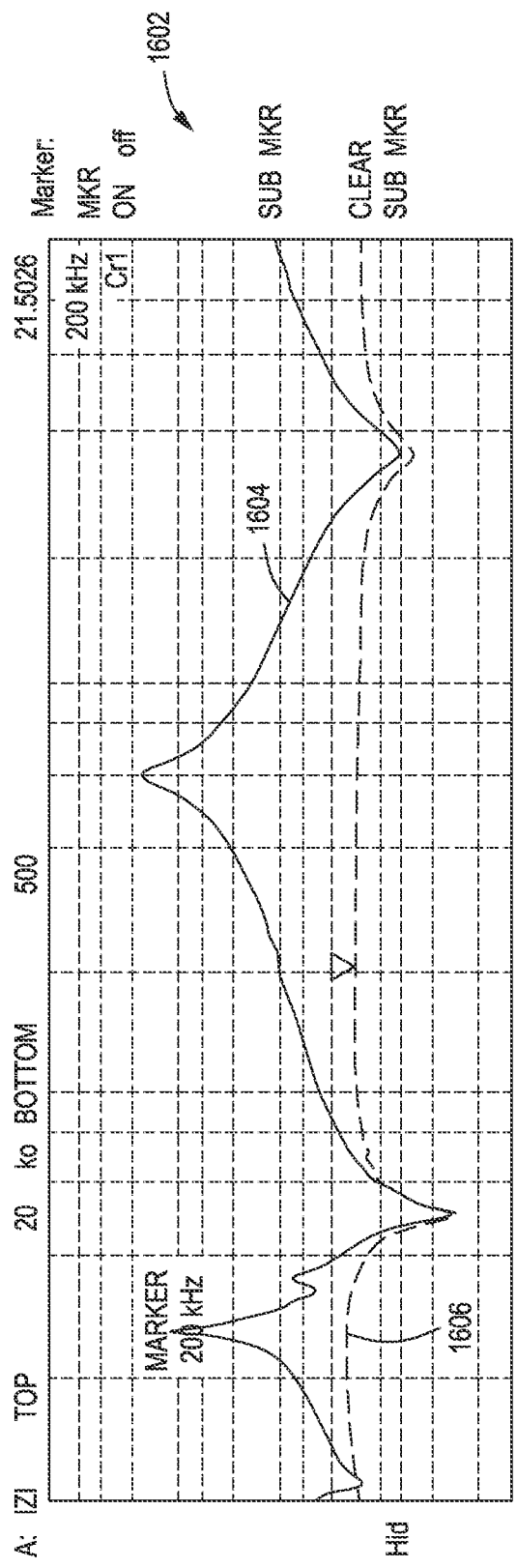
FIG. 16 is a diagram of a measurement of a driving point impedance in series with a second X2 cap, in accordance with at least some embodiments of the present disclosure.
Figure 16:
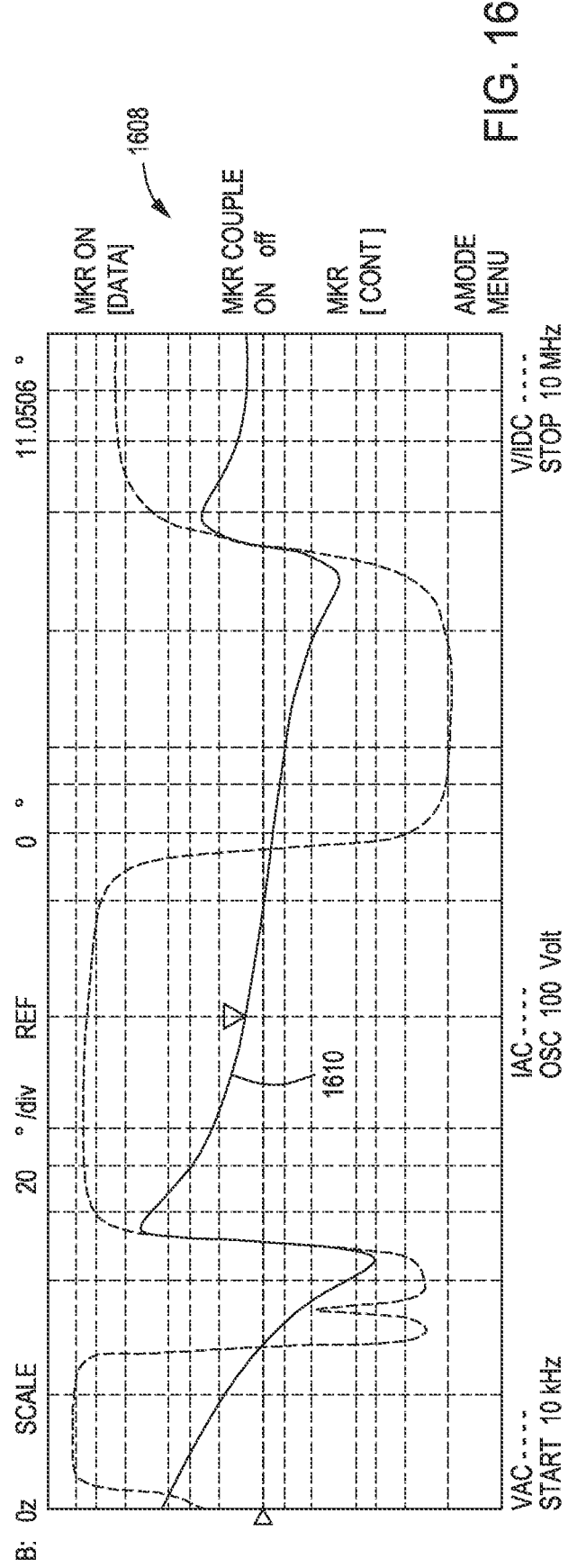

Driving point impedance looking into the primary of the cancellation signal injection transformer 1506 can be measured with an impedance analyzer (not shown). To evaluate the suitability of a chosen signal injection location within the line filter emulation module 104, an initial impedance sweep is done with no termination resistor placed across the transformer, then an additional sweep with the appropriate filter termination resistor placed across the transformer is performed. The results of two such impedance sweeps are shown in FIG. 16. For the upper magnitude plot 1602, the 1604 trace shows the unterminated driving point impedance, while the 1606 trace shows the terminated impedance. As disclosed above, a close approximation of a constant terminating resistance across the signal passband of about 100 kHz to about 1 MHz can be achieved.

Without a 22.1Ω termination resistor (e.g., the 1604 trace), there is large peaking of the impedance magnitude at 570 kHz, due to a parallel resonance between the differential chokes and Y-caps. When the termination resistor is in place, the impedance magnitude flattens out considerably over the signal passband, varying from 19.3Ω up to 22.0Ω. Similarly, the unterminated and terminated impedance angle is shown in the lower plot 1608 of FIG. 16. When the termination resistor is in place (the 1610 trace) the angle ranges from about 26° to about −4° over the signal passband. Given the relatively small deviations from the ideal, in at least one embodiment, the small deviations can be corrected in the magnitude and phase equalization module 106, or the small deviations can be ignored as negligible error.

Figure 17:
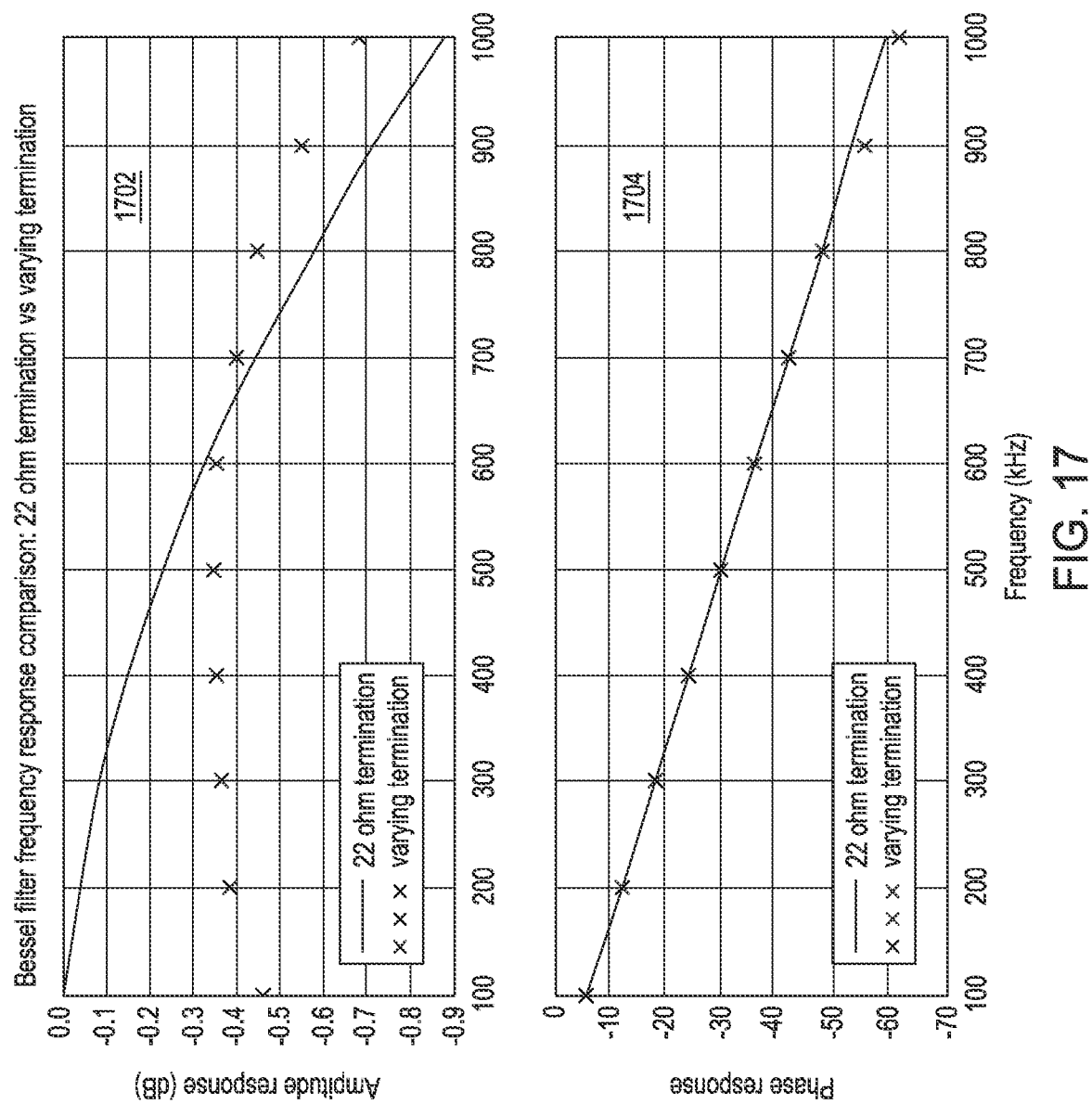
FIG. 17 is a graph of phase and magnitude response error vs. frequency, due to non-constant terminating impedance, in accordance with at least some embodiments of the present disclosure.

FIG. 17 is a graph of phase and amplitude response vs. frequency, in accordance with at least some embodiments of the present disclosure. More particularly, magnitude and phase errors in the transfer function of the passive filtering module 116, due to the non-ideal 1702 terminating impedance over the signal passband of 100 kHz to 1 MHz, are shown in the top graph of FIG. 17. Worst-case magnitude deviation is about 0.5 dB which represents less than 6% distortion of the signal magnitude at 100 kHz. The phase response shows very little deviation from ideal 1704 shown in the bottom graph of FIG. 17. The magnitude and phase distortion due to non-constant termination impedance are minor enough and can be ignored, but in some embodiments, corrections could be added to adjust phase and/or magnitude in the magnitude and phase equalization module 106, if necessary.

A method for reducing electromagnetic interference (EMI) in power conversion equipment is described herein. For example, discrete-time modelling techniques within a power controller module may be used to predict or re-construct an appropriate power stage voltage or current waveforms (for example, bridge output current) that are applied to a line filter, e.g., the line filter emulation module 104. Such methods can utilize pre-existing information within the controller (for example, power semiconductor gating waveforms and measured resonant tank current) to re-construct the power stage waveforms that excite the line filter in real time.

The re-constructed or predicted power stage voltage or current waveforms described above may then be used for real-time prediction of ripple voltage (e.g., the ripple voltage $V_{RIP}$ 105 signal) or ripple current at appropriate locations in the line filter, utilizing discrete-time modeling techniques. For example, the line filter emulation module 104 can advantageously incorporate virtual damping (where no such damping might exist in the actual line filter), to avoid inadvertent excitation of the line filter resonant modes by the active filter controller, e.g., the control module 108.

A suitable ripple cancellation signal (e.g., the ripple voltage $V_{RIP}$ 105 signal) can be generated from synthesizing the real-time estimation of line filter ripple voltages or ripple currents. The ripple cancellation signal can, optionally, be compensated for magnitude and/or phase distortions in the signal path—predominantly due to the frequency response characteristics of the delta-sigma modulation module 110 and the passive filtering module 116.

As described above, a suitable injection point within the line filter circuitry may be selected, such that the driving point impedance seen across the injection nodes is essentially constant and resistive over the designated signal passband.

Low-power circuitry techniques may be used for delivering the synthesized ripple cancellation signal to the chosen injection point. In at least one embodiment of the present disclosure, the delta-sigma modulation module 110 and the passive filtering module 116 implement an energy-efficient digital-to-analog Converter (DAC) for injection of the ripple cancellation signal.

A ripple power estimation block and programmable hysteretic comparator may be used to (optionally) decide when to enable/disable the active EMI filter 100. Operation in this mode provides gating the filter on and off multiple times during an ac mains line cycle (for example, enabling the modulator only during the line current peaks when conducted emissions are at elevated levels). The ripple power estimator can be designed to reject spectral components that are out of band (for example, outside of the intended signal passband of about 100 kHz to 1 MHz) to avoid enabling the modulator due to excitation of low-frequency resonant modes in the line filter.

The techniques described herein are applicable to a broad range of power conversion topologies including, but not limited to, buck, boost PFC, quasi-resonant flyback, series-resonant, LLC-resonant, single-phase, or three-phase voltage-source inverters, and/or current-source inverters.

Figure 18:
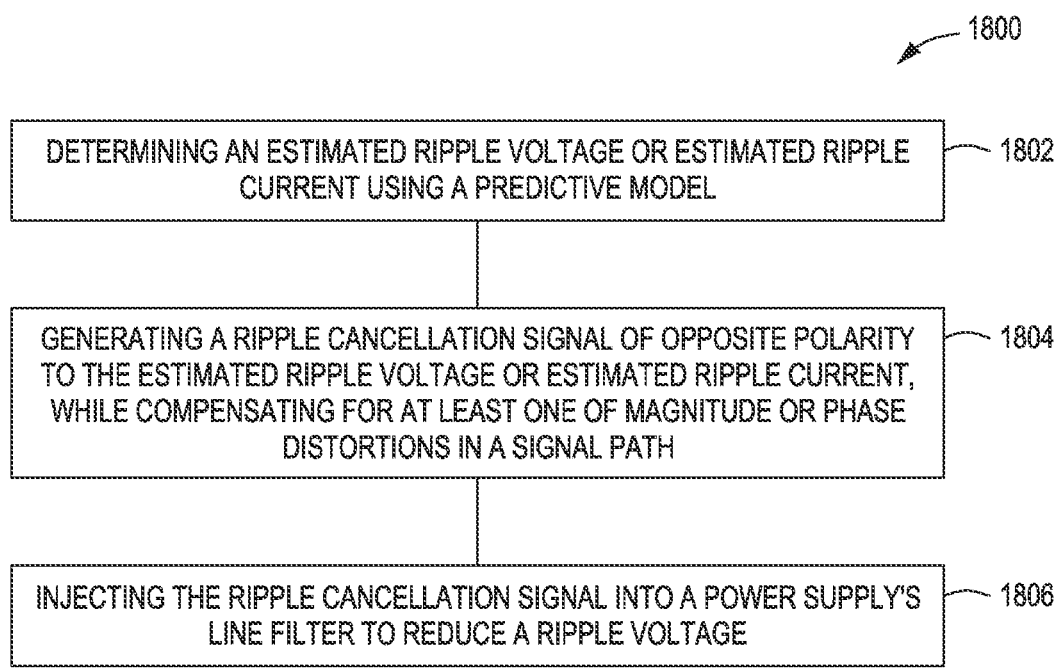
FIG. 18 is a flowchart of a method for reducing electromagnetic interference (EMI) in power conversion stage line filter, in accordance with at least some embodiments of the present disclosure.

FIG. 18 is a method 1800 for reducing electromagnetic interference (EMI) in power conversion stage line filter. For example, in at least some embodiments the active EMI filter 100, under control of the active filter management and control module 108, can be configured to reduce conducted differential EMI, e.g., from about a 100 kHz to about 1 MHz frequency band, in power conversion stage line filter.

For example, at 1802, the method 1800 comprises determining an estimated ripple voltage or estimated ripple current using a predictive model. For example, an approximate real-time prediction of the ripple voltage $V_{RIP}$ 105 that needs to be cancelled can be obtained using the AC bridge output current reconstruction module 102 and the line filter emulation module 104.

Next, at 1804, the method 1800 comprises generating a ripple cancellation signal of opposite polarity to the estimated ripple voltage or ripple current, while compensating for at least one of magnitude or phase distortions in a signal path. For example, in at least some embodiments, the method 1800 comprises reconstructing an ac bridge output current in response to receiving semiconductor gating waveforms or measured resonant tank current. For example, the ac bridge output current can be reconstructed after receiving an AC FET gate drive signals and/or tank current signals (e.g., measurement or estimation). In at least some embodiments, reconstructing the ac bridge output current comprises selecting at least one of an offset-compensated tank current measurement or using an estimated resonant current. Additionally, in at least some embodiments, compensating for the at least one of magnitude or phase distortions in the signal path comprises generating a transfer function of the magnitude and phase based on the equation $H_{\_EQ}(z) = -STF^{-1}(z) \cdot H^{-1}_{LP}(z) \cdot H^{-1}_{INJ}(z)$ and compensating for frequency response within a signal passband of about 100 kHz to 1 MHz.

Next, at 1806, the method 1800 comprises injecting the ripple cancellation signal into a power supply's line filter to reduce a ripple voltage. In at least some embodiments, the ripple cancellation signal reduces the ripple voltage about 15 dB.

In at least some embodiments, the method 1800 can further include indexing through a raised cosine lookup table to adjust an amplitude of the ripple cancellation signal to avoid excitation of line filter resonant modes. For example, the active filter management and control module 108 can index through the raised cosine lookup table 906. Additionally, the active filter management and control module 108 can generate at least one of firmware enable signal, a blend duration signal, or a firmware gain control signal. Moreover, the active filter management and control module 108 can autonomously enabling or disabling signal injection circuitry dependent on a power level of the estimated ripple voltage or estimated current.

While the foregoing is directed to embodiments of the present disclosure, other and further embodiments of the disclosure may be devised without departing from the basic scope thereof, and the scope thereof is determined by the claims that follow.

What is claimed is:

1. A method for reducing electromagnetic interference (EMI) in a power conversion stage line filter, comprising:
   determining an estimated ripple voltage or estimated ripple current using a predictive model;
   generating a ripple cancellation signal of opposite polarity to the estimated ripple voltage or estimated ripple current, while compensating for at least one of magnitude or phase distortions in a signal path, wherein compensating for the at least one of magnitude or phase distortions in the signal path comprises generating a transfer function of the magnitude or phase based on equation $H_{EQ}(z) = -STF^{-1}(z) \cdot H^{-1}_{LP}(z) \cdot H^{-1}_{INJ}(z)$ and compensating for frequency response within a signal passband of about 100 kHz to 1 MHz, wherein STF(z) represents signal transfer function, Hlp (z) represents passive low-pass filter function, and Hinj (z) represents injection circuitry function; and injecting the ripple cancellation signal into a power supply's line filter to reduce a ripple voltage.

2. The method of claim 1, wherein generating the ripple cancellation signal comprises reconstructing an ac bridge output current in response to receiving semiconductor gating waveforms or measured resonant tank current.

3. The method of claim 2, wherein reconstructing the ac bridge output current comprises selecting at least one of an offset-compensated tank current measurement or using an estimated resonant current.

4. The method of claim 1, further comprising indexing through a raised cosine lookup table to adjust an amplitude of the ripple cancellation signal to avoid excitation of line filter resonant modes.

5. The method of claim 1, further comprising generating at least one of firmware enable signal, a blend duration signal, or a firmware gain control signal.

6. The method of claim 1, further comprising autonomously enabling or disabling signal injection circuitry dependent on a power level of the estimated ripple voltage or estimated current.

7. The method of claim 1, wherein the ripple cancellation signal reduces the ripple voltage about 15 dB.

8. A non-transitory computer readable storage medium having stored thereon instructions that when executed by a processor perform a method for reducing electromagnetic interference (EMI) in power conversion stage line filter, the method comprising:

determining an estimated ripple voltage or estimated ripple current using a predictive model;

generating a ripple cancellation signal of opposite polarity to the estimated ripple voltage or estimated ripple current, while compensating for at least one of magnitude or phase distortions in a signal path, wherein compensating for the at least one of magnitude or phase distortions in the signal path comprises generating a transfer function of the magnitude or phase based on equation $H_{EQ}(z)=-STF^{-1}(z) \cdot H^{-1}_{LP}(z) \cdot H^{-1}_{INJ}(z)$ and compensating for frequency response within a signal passband of about 100 kHz to 1 MHz, wherein STF(z) represents signal transfer function, Hlp (z) represents passive low-pass filter function, and Hinj (z) represents injection circuitry function; and injecting the ripple cancellation signal into a power supply's line filter to reduce a ripple voltage.

9. The non-transitory computer readable storage medium of claim 8, wherein generating the ripple cancellation signal comprises reconstructing an ac bridge output current in response to receiving semiconductor gating waveforms or measured resonant tank current.

10. The non-transitory computer readable storage medium of claim 9, wherein reconstructing the ac bridge output current comprises selecting at least one of an offset-compensated tank current measurement or using an estimated resonant current.

11. The non-transitory computer readable storage medium of claim 8, further comprising indexing through a raised cosine lookup table to adjust an amplitude of the ripple cancellation signal to avoid excitation of line filter resonant modes.

12. The non-transitory computer readable storage medium of claim 8, further comprising generating at least one of firmware enable signal, a blend duration signal, or a firmware gain control signal.

13. The non-transitory computer readable storage medium of claim 8, further comprising autonomously enabling or disabling signal injection circuitry dependent on a power level of the estimated ripple voltage or estimated current.

14. The non-transitory computer readable storage medium of claim 8, wherein the ripple cancellation signal reduces the ripple voltage about 15 dB.

15. An active electromagnetic interference (EMI) filter comprising:

an active filter management and control module configured to:

determine an estimated ripple voltage or estimated ripple current using a predictive model;

generate a ripple cancellation signal of opposite polarity to the estimated ripple voltage or estimated ripple current, while compensating for at least one of magnitude or phase distortions in a signal path, wherein compensating for the at least one of magnitude or phase distortions in the signal path comprises generating a transfer function of the magnitude or phase based on equation $H_{EQ}(z)=-STF^{-1}(z) \cdot H^{-1}_{LP}(z) \cdot H^{-1}_{INJ}(z)$ and compensating for frequency response within a signal passband of about 100 kHz to 1 MHz, wherein STF(z) represents signal transfer function, Hlp (z) represents passive low-pass filter function, and Hinj (z) represents injection circuitry function; and inject the ripple cancellation signal into a power supply's line filter to reduce a ripple voltage.

16. The active electromagnetic interference (EMI) filter of claim 15, wherein the active filter management and control module is further configured to reconstruct an ac bridge output current in response to receiving semiconductor gating waveforms or measured resonant tank current.

17. The active electromagnetic interference (EMI) filter of claim 16, wherein reconstructing the ac bridge output current comprises selecting at least one of an offset-compensated tank current measurement or using an estimated resonant current.

* * * * *